United States Patent [19]

Holroyd et al.

[11] 4,199,419
[45] Apr. 22, 1980

[54] PHOTOCHEMICAL METHOD FOR GENERATING SUPEROXIDE RADICALS ($O_2^-$) IN AQUEOUS SOLUTIONS

[75] Inventors: Richard A. Holroyd, Stony Brook; Benon H. J. Bielski, Wading River, both of N.Y.

[73] Assignee: The United State of America as represented by the Department of Energy, Washington, D.C.

[21] Appl. No.: 973,845

[22] Filed: Dec. 28, 1978

[51] Int. Cl.$^2$ .......................... B01J 1/10; B01K 1/00
[52] U.S. Cl. .......................... 204/157.1 R; 204/158 R; 250/527
[58] Field of Search .................. 204/157.1 R, 158 R; 250/527, DIG. 11

[56] References Cited

U.S. PATENT DOCUMENTS

| | | | |
|---|---|---|---|
| 3,641,389 | 2/1972 | Leidigh | 313/231.7 |
| 4,072,590 | 2/1978 | Niemann et al. | 204/157.1 R |
| 4,124,467 | 11/1978 | Pincon | 204/157.1 R |

Primary Examiner—Howard S. Williams
Attorney, Agent, or Firm—R. V. Lupo; Leonard Belkin; Cornell D. Cornish

[57] ABSTRACT

A photochemical method and apparatus for generating superoxide radicals ($O_2^-$) in an aqueous solution by means of a vacuum-ultraviolet lamp of simple design. The lamp is a microwave powered rare gas device that emits far-ultraviolet light. The lamp includes an inner loop of high purity quartz tubing through which flows an oxygen-saturated sodium formate solution. The inner loop is designed so that the solution is subjected to an intense flux of far-ultraviolet light. This causes the solution to photodecompose and form the product radical ($O_2^-$).

13 Claims, 9 Drawing Figures

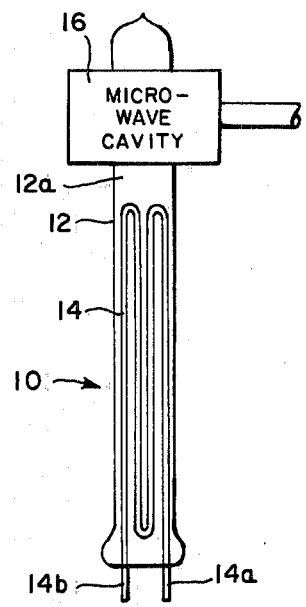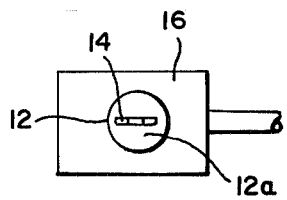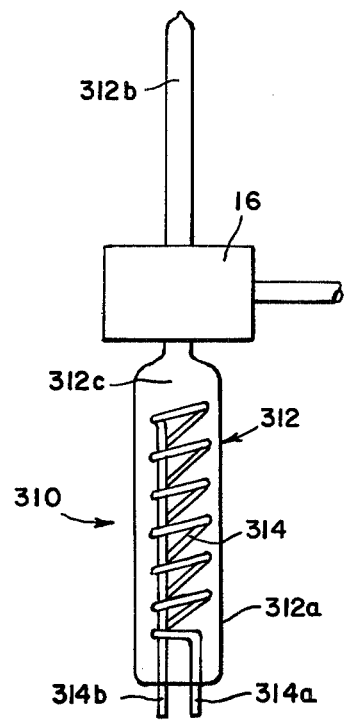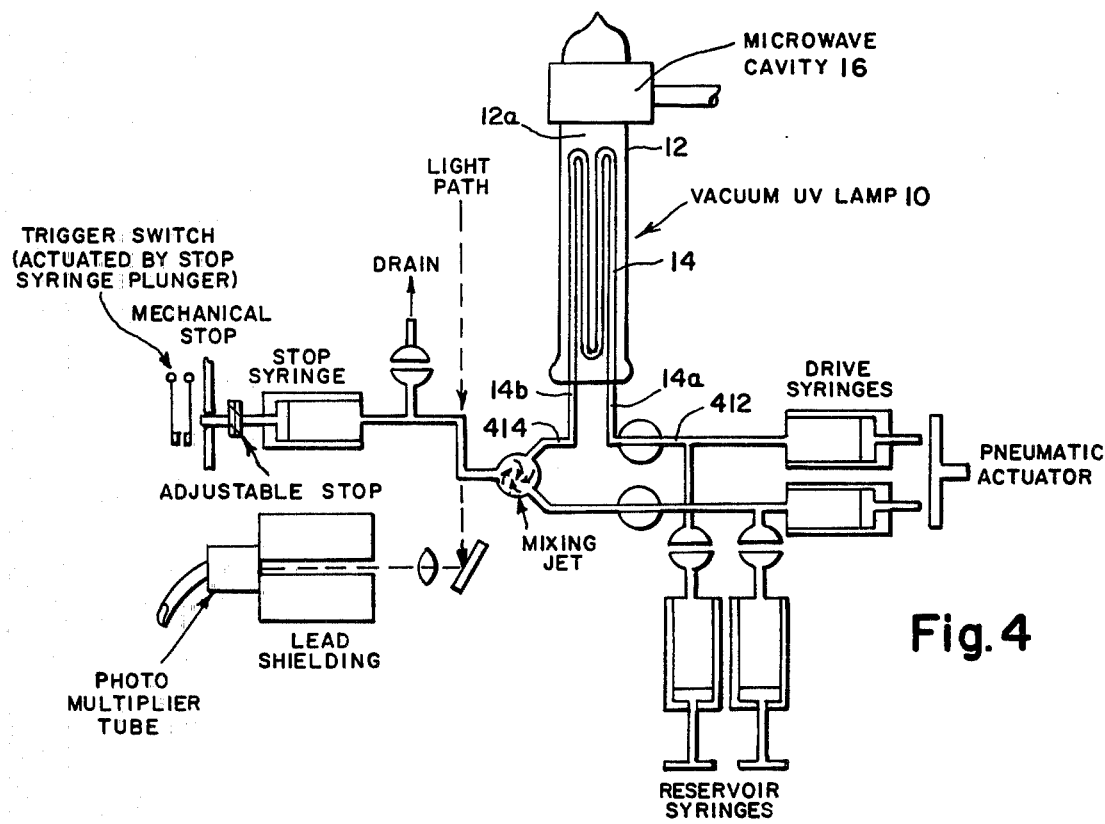

PHOTOCHEMICAL METHOD FOR GENERATING SUPEROXIDE RADICALS ($O_2^-$) IN AQUEOUS SOLUTIONS

This invention relates to a method and apparatus for generating superoxide radicals in aqueous solutions, and more particularly, the invention relates to a photochemical process for generating relatively large quantities of superoxide radicals ($O_2^-$) in water.

This invention was made under, or during the course of, a contract with the United States Department of Energy.

The involvement of free radicals in the deleterious effects of oxygen pollutants on living cells has been postulated for some time, but knowledge in this area is limited. Since the discovery of a superoxide dismutation activity in bovine erythrocuprein, which was therefore named superoxide dismutase, there has been a surge of research activity on the superoxide radical in biological systems. It has been found that this oxygen radical is not only a product of pollutants like ozone or high-energy ionizing radiation, but also a natural intermediate in various biochemical reactions. In biological systems this radical ($O_2^-$) and its "active oxygen" derivates have been implicated in such biological phenomena as hydroxylation of metabolic intermediates, inflamation, bactericidal activity of leukocytes, aging, radiation therapy, and carcinogenesis. The mechanisms of the involvement of the superoxide radical ($O_2^-$) in these biological systems are not well understood. For example, although there is some thermodynamic information available from which one can compute whether $O_2^-$ or $HO_2$ can react with a particular compound, such predictions are not always possible or accurate since frequently little is known about the degree of resonance stabilization of the product radical. This is particularly true in biological systems where an unstable radical could stabilize on an enzyme, membrane or some other species. Hence, techniques have been sought which would permit evaluation of the chemical reactivity of superoxide radicals ($O_2^-$) with compounds of biological interest.

However, the superoxide radical ($O_2^-$) is a reactive free radical which can not be stored in water for long periods. This radical must be generated for each experiment and the methods and apparatus used for such generation as practiced heretofore tend to be unduly complicated, or their yields tend to be low, or both. Prior processes include enzymatic, electrochemical, photochemical, and pulse radiolysis. Each of these methods has its merits and drawbacks. For example, the pulse radiolysis method, when used with a stopped-flow spectrophotometer, has the disadvantage of requiring a source of ionizing radiation such as a Van de Graaff accelerator. According to this process, a solution of the radical of interest is generated as a liquid passes through a 2-MeV electron beam. But, these accelerators are expensive and relatively cumbersome to use.

However, vacuum-UV photolysis has an effect similar to radiation in that the water is dissociated into H and OH radicals:

The quantum yields of reaction 1 is 0.33 at 184.9 nm and 0.79 at 147 nm.

The quantum yield of $O_2^-$ should be equal to twice the quantum yield of reaction 1, since in the presence of oxygen, H atoms are converted to $O_2^-$ (reaction 2, below). Also, the addition of formate is known from pulse radiolysis studies to convert oxidizing OH species to the reducing species $CO_2^-$. In the presence of oxygen these also convert to $O_2^-$ (reaction 4 and 5, below):

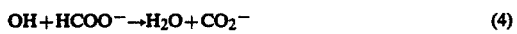

Thus, the present invention overcomes several drawbacks associated with prior constructions and methods used to generate the superoxide radical ($O_2^-$) and provides for a simplified design for such generation wherein the radical ($O_2^-$) is generated by photodecomposition of water. In general, and in accordance with the invention, a vacuum-ultraviolet lamp is comprised of an outer envelope constructed from quartz or Pyrex glass. The quartz envelope surrounds an internal loop or flow-path comprised of high purity quartz tubing. The outer envelope is filled with a rare gas under pressure and sealed. A microwave generator excites and drives the rare gas causing the same to emit intense far-ultraviolet light. An aqueous solution is pumped through the internal loop or path. This solution is, preferably, comprised of solvent water containing sodium formate and oxygen. The internal loop or path acts as a window through which the far-ultraviolet light passes irradiating the aqueous solution being pumped therethrough. The construction of this inner coil or loop is such that it has a large surface area while its volume is relatively small. Hence the quantity of fluid being pumped through the internal coil is exposed to an intense flux of far-ultraviolet light. The intense far-ultraviolet flux causes the water to photodecompose into free radicals. These free radicals are converted by solutes in the water into $O_2^-$ radicals. Because the volume of solution passing through the inner coil is small, this in conjunction with the large surface area of the coil yields high concentrations of the product radical ($O_2^-$). High pH (11) can be employed to stabilize the $O_2^-$ radicals. The solutions of $O_2^-$ prepared are free of all organic compounds with the exception of formate. The construction of the lamp is such that is readily adapted for use with a stopped-flow spectrophotometer or ESR spectrometer.

It is therefore an object of the present invention to provide a method and apparatus for photochemical generation of the superoxide radical ($O_2^-$) in an aqueous solution.

It is another object of the present invention to provide a method and apparatus for generating superoxide ($O_2^-$) in relatively large quantities wherein the solutions of $O_2^-$ prepared are free of all organic compounds with the exception of formate.

It is another object of the present invention to provide a method and apparatus for generating superoxide ($O_2^-$) radicals in water wherein the apparatus and method is readily adapted for use in a stopped-flow radiolysis machine.

It is a further object of the present invention to provide a method and apparatus for generating $O_2^-$ radicals which is simple in design and capable of generating concentrations of approximately 200 μMoles/liter of these radicals in less than a minute.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

In the drawings wherein the same reference numerals denote the same element throughout the several views:

FIG. 1 is an elevational view of one embodiment of a vacuum-ultraviolet lamp used to generate the product radical ($O_2^-$) according to the present invention, a microwave cavity or microwave source used in exciting the rare gas is seen coupled to the lamp and shown also is the internal loop or path through which the aqueous solution flows;

FIG. 2 is a top view of that shown in FIG. 1;

FIG. 3 is another embodiment of a vacuum-ultraviolet lamp used to generate the superoxide radical $O_2^-$ according to the present invention, the internal path through which the aqueous solution flows is in the form of a coil, sections of which are wound helically;

FIG. 4 is an illustration in diagramatic form showing use of the inventive lamp of FIG. 1 in a "stopped-flow machine" to study the chemical reactions of the $O_2^-$ radical;

Figure 7:
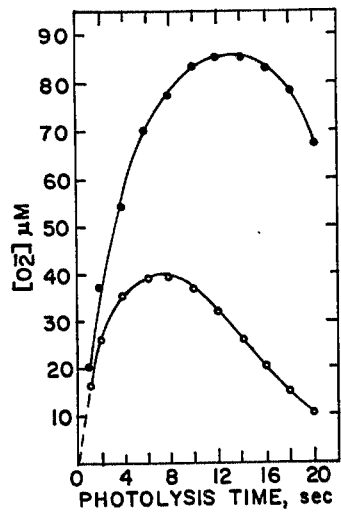
Figure 8:
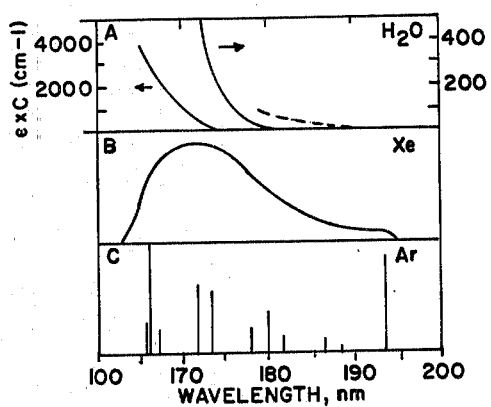
Figure 9:
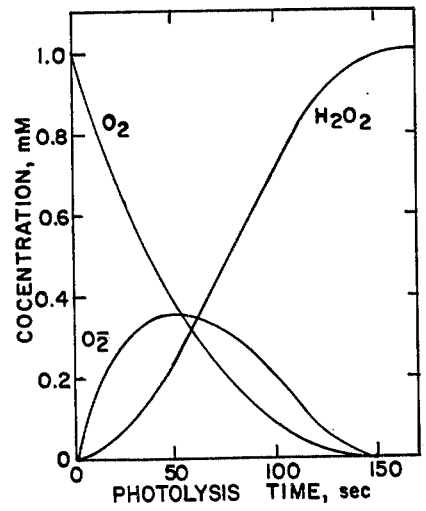

FIG. 7 is a plot of yield of $O_2^-$ as a function of photolysis time for an Ar lamp of the present invention (pressure=1 Torr) operated at 50 W. Solution contained 0.01 M formate at pH 11.2; O, air saturated; O, $O_2$ saturated;

FIG. 8 is a plot of spectra: (A) absorption spectra of liquid water (solid lines) and 0.02 M formate (dotted lines); (B) emission spectrum from Xe lamp at 30 Torr; (C) emission spectrum from an "ungettered" Ar lamp according to the present invention at 1 Torr; and, FIG. 9 is a plot of computer-calculated curves showing concentration of $O_2$, $O_2^-$, and $H_2O_2$ as a function of photolysis time. Calculation is for a 0.02 M formate solution and an absorbed light intensity of 20 Einsteins/L.$_s$.

More particularly now and referring to the drawings, FIGS. 1 and 2 show one embodiment of the inventive ultraviolet lamp used to generate the superoxide radical ($O_2^-$) by photodecomposition of an aqueous solution. The lamp is seen generally as reference numeral 10 and it includes an outer quartz envelope or jacket 12 comprised of either quartz or Pyrex glass. In the preferred form and as shown, envelope 12 generally is elongate, that is, the longitudinal axis of jacket 12 is several times its transverse cross-sectional diameter. Disposed within envelope 12 is an inner tube or coil 14 that defines an internal flow-path through which is pumped the aqueous solution to be photodecomposed. Inner tube 14 is comprised of high purity quartz an example of which is the T21 (clear fused quartz) Suprasil tubing manufactured by Heraeus-Amersil, 650 Jernees Mill Road, Sayreville, New Jersey 08872. In the embodiment shown in FIGS. 1 and 2, tubing or path 14 is in the form of an array of return-folded interconnected elongate loops, that, in a manner of speaking, defines a plurality of multi-connected parallel banks. In practice, and by way of illustration only, satisfactory results are obtained when path 14 is constructed from a 60 cm piece of 0.1 cm i.d. Suprasil quartz tube. Extending from envelope 12 is a loop-input extension 14a and a loop-output extension 14b. Each extension 14a and 14b is in fluid-communication with a respective end of path or tube 14.

Envelope 12, or, more precisely, space 12a enclosed thereby, is filled with a rare gas under pressure and sealed. In practice the lamp is filled with from 1 to 200 Torr of either Xenon or Argon. A microwave cavity or generator 16 is perimetrically attached to lamp 12 as shown. During operation of the embodiment of FIGS. 1 and 2 as will be discussed below, a Tesla coil, not shown, initiates the plasma discharge of lamp 10 by means of a procedure commonly known to those skilled in the art. Microwave source 16 then drives or excites the rare gas to maintain this discharge with the result being that an intense and continuous flux of far-ultraviolet light is emitted. Inner Suprasil quartz loop 14 acts as a window through which the far-ultraviolet light passes thereby irradiating the aqueous solution therein. Lamps constructed according to the present invention have been found to emit from 2 to $4 \times 10^{15}$ quanta/sec.

Turning now to FIG. 3 there is shown another embodiment of the present invention somewhat similar to the embodiment of FIGS. 1 and 2. In the embodiment of FIG. 3, the inventive ultraviolet lamp used to generate the superoxide radical $O_2^-$ by photodecomposition of water is seen generally as reference numeral 310. In a manner similar to the earlier described embodiment, lamp 310 includes an outer quartz envelope 312 comprised of either quartz or Pyrex glass. The envelope is defined by a relatively wide lower envelope body 312a and an integrally formed relatively narrow upper envelope stem or neck 312b. An inner tube or coil 314 is disposed within lower envelope section 312a and, as shown, inner coil 314 is generally helically wound or, put another way, wound with a helical component. Inner coil 314 thus defines a flow-path through which is pumped the aqueous solution to be photodecomposed. Coil or flow path 314 is comprised of high purity quartz such as the T21 Suprasil tubing mentioned above. The space 312c within, or defined by, the outer envelope is filled or pressurized with a rare gas such as Xenon or Argon and then the envelope is sealed. Extending from envelope section 312a is a loop-input extension 314a and a loop-output extension 314b. Each extension 314a and 314b is in fluid-communication with a respective end of path 314. During operation of the embodiment of FIG. 3, as will be discussed below, a Telsa coil, not shown, initiates the plasma discharge in lamp 310 as was noted with respect to the earlier described embodiment.

A microwave source 16 is perimetrically coupled to lamp 310 in a way that places it contiguous to envelope stem 312b as shown. Microwave source 16 maintains the discharge initiated by the Telsa coil resulting in an intense and continuous flux of far-ultraviolet light being emitted. Inner Suprasil quartz loop 314 acts as a window through which the ultraviolet light passes thereby irradiating the aqueous solution contained therein.

Operation and use of the embodiment of FIGS. 1 and 2, can best be understood with reference to FIGS. 4, 5, 6, 7, 8 and 9. Operation and use of the embodiment of FIG. 3 will not be discussed separately because it will be apparent that its operation is generally similar to the operation of the lamp of FIG. 1. Thus, referring now to FIG. 4, the inventive lamp is shown used in conjunction with the stopped-flow radiolysis technique or machine that has been developed for spectrophotometric studies of secondary free radicals which have relatively long lifetimes, that is, half-lives in excess of a few milliseconds. H. J. Bielski and H. W. Richter describe this technique and machine in more detail in "A Study of the Superoxide Radical Chemistry by Stopped-Flow Radiolysis and Radiation Induced Oxygen Consumption," *Journal of the American Chemical Society*, 99, 3019 (1977). The stopped-flow radiolysis technique offers the advantage of allowing the study of free-radical reactions in isolation, that is, a single radical species can be studied in absence of other radicals. In accordance with the cited technique, lamp 10 is connected to or is placed in fluid-communication with the stopped-flow machine diagramatically seen in FIG. 4. This is accomplished by coupling path-input extension 14a to machine supply line 412, and coupling path-output extension 14b to machine input or mixing line 414. The water to be photolyzed flows through the tubing 14 inside the arc and is surrounded by the plasma discharge. The "window" is the wall of inner coil 14 which has an area of 20 cm$^2$. The vacuum-UV light passing through the window is totally absorbed in the 0.5 cm$^3$ of water in the coil. Alternately the lamps may have a flat Suprasil end window which can be immersed in the aqueous solution. The lamps are first evacuated to 10$^{-6}$ Torr and baked at 400° C. for 48 h. They are then filled with either a few torr of Ar or a medium pressure (10–100 Torr) of Xe. In some lamps a small amount of N$_2$ is added. The lamps are powered by a 100-W microwave generator 16 (KIVA Model MPG-4M) with an Evenson-type cavity. Microwave generator 16 operates either dc or pulsed (70–800 Hz). The lamp emission spectra are recorded on a McPherson Model 218 spectrophotometer.

Since the decomposition of O$_2^-$ solutions is catalyzed by small traces of metal, it is essential that all chemicals by highly and carefully purified. No metal instrument or vessel can be used. The sodium formate, phosphate, and EDTA are recrystallized prior to use. The water is distilled and then treated by a Milli-Q reagent grade water system. The solutions are stored in quartz vessels.

For kinetic and spectral studies the yields of O$_2^-$ were measured using a Durrum Model D 110 stopped-flow fast kinetics spectrophotometer at λ=260 nm where ε=1925 M$^{-1}$cm$^{-1}$. In this instrument the effluent from the lamp 10 mixes with an equal volume (0.5 cm$^3$) of acid in order to lower the pH and follow the O$_2^-$ decay. The yield of O$_2^-$ is calculated from the initial absorbance. Since O$_2^-$ solutions are relatively stable at high pH, solutions can also be photolyzed as they flow through the lamp. The O$_2^-$ in the effluent stream is then assayed spectrophotometrically at 260 nm. This method is convenient for testing the output of different lamp designs and parameters. Hydrogen peroxide was assayed by the iodide method. The ESR spectrum of O$_2^-$ was recorded at 95 K on a Varian Model 4500 ESR spectrometer.

Figure 5:
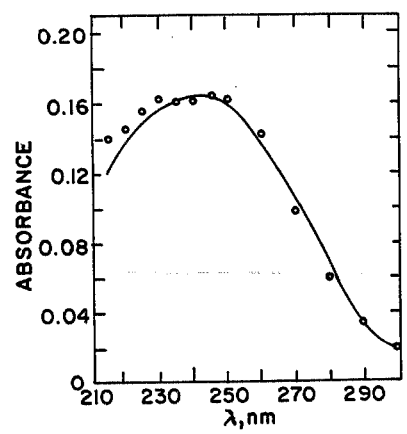
FIG. 5 is a plot of absorption spectra of product formed in the vacuum-UV photolysis of an oxygen-saturated aqueous solution of 0.01 M formate according to the invention, 10 second exposure in Ar lamp at 50 W power; O, photolysis; solid line is spectrum of $O_2^-$.

FIG. 5 shows the absorption spectrum of O$_2^-$ formed by photolysis with an Ar lamp. The solid line represents the O$_2^-$ spectrum obtained by radiolysis of this solution. There is good agreement between the two spectra except for the slightly higher absorbance at wavelengths below 230 nm in the photolysis case which is attributed to interference by H$_2$O$_2$.

The decay rate of the O$_2^-$ was determined with the stopped-flow spectrophotometer. The decay follows second-order kinetics and the observed rate constants are 2.7×10$^4$ M$^{-1}$s$^{-1}$ at pH 8.3 and 8.7×10$^5$ M$^{-1}$s$^{-1}$ at pH 2.0.

Figure 6:
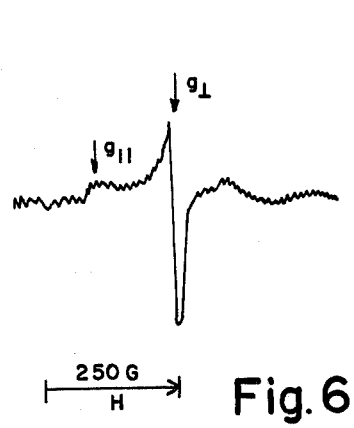
FIG. 6 is a plot of an ESR spectrum of $O_2^-$ formed in the photolysis of oxygen-saturated 0.02 M formate at pH 11.7, g⊥=2.006, g∥ =2.103; sample at 95 K.

The ESR spectrum of O$_2^-$ at 95 K is shown in FIG. 6. This spectrum was obtained by flowing an oxygen-saturated aqueous solution of 0.02 M formate at pH 11.7 through an Ar lamp (pressure 1 Torr) and freezing the effluent. This spectrum is an asymmetric singlet. The low-field parallel feature was found at g∥=2.103 and the more intense perpendicular component at g⊥=2.006.

Typically the yield of O$_2^-$ as a function of photolysis time first increases, passes through a maximum, and then decreases, as shown in FIG. 7. The yield of O$_2^-$ is the observed yield at the end of the photolysis and is not corrected for spontaneous decay. Decay is minor since k$_{obsd}$ is about 10 M$^{-1}$s$^{-1}$ at the pH used (11.5). Increasing the initial oxygen concentration enhances the initial rate of O$_2^-$ formation slightly and increases the maximum yield considerably. For oxygen-saturated formate solutions, concentrations of O$_2^-$ greater than 200 μM are attained at the maximum (Tables I and II). The yield of peroxide is small initially but increases rapidly at later times, as is shown in the final columns of the tables. The ratio [O$_2^-$]/[H$_2$O$_2$] is large initially and steadily decreases with time to values less than one.

The time at which the superoxide yield reaches a maximum varies from lamp to lamp and is attributed to differences in absorbed light intensity. Where the initial rate is high (20 μM/s for the data shown in FIG. 7), the maximum is attained in 13 s. Where the initial rate is lower, as for the 30-Torr Xe lamp (Table II), the maximum is attained at 80 s. (The absorbed light intensity is also a function of the penetration depth, discussed below.)

The yield of O$_2^-$ at short times is approximately linearly dependent on microwave power (Table II). The dependence becomes sublinear at higher power and at longer times. The O$_2^-$ yield is independent of formate concentration from 1 to 100 mM.

The factor in lamp construction which influences the yield of O$_2^-$ most is surface area of the window. Most of the lamps used had window areas of 20 cm$^2$. Lamps of greater area produce proportionately more O$_2^-$. Another factor affecting the output is pressure of rare gas. For a Xe lamp the yield of O$_2^-$ increases with pressure between 5 and 40 Torr and then levels off about 40 Torr (Table II). The lamp designs shown make no provision for cooling of the solutions; however in modified lamps the coil can be cooled with N$_2$ gas to prevent heating the solution which interferes with the spectrophotometric measurements. Individual lamps have been used over periods of months; in general, lamps made of all quartz proved more reliable than those with Pyrex outer walls.

The first absorption band of water has a maximum at 150 nm in the liquid phase, which is considerably blue shifted compared to the vapor phase. The absorption spectrum of liquid water in the region of interest is shown in FIG. 8A. The presence of oxygen enhances the absorption slightly at long wavelengths (red shift). The solutes OH$^-$ and HCOO$^-$ also absorb in this region. As shown in FIG. 8A, absorption by HCOO$^-$ is significant at wavelengths above 180 nm. Absorption by OH⁻ is weak except at very high pH.

The emission spectrum of the Xe lamp at 30 Torr with a Suprasil window is shown in FIG. 8B; there is a continuum extending from the Suprasil cutoff to 195 nm with a maximum at 172 nm. For a nongettered lamp filled with 1 Torr of Argon, many lines are observed between 165 and 193 nm due to adventitious impurities (FIG. 8C). The lines below 170 nm are strongly absorbed near the window and do not contribute significantly to the $O_2^-$ yield. The line at 193 nm (due to carbon) is not absorbed significantly. The useful lines are those between 170 and 182 nm. The output of the lamps constructed in accordance with the present invention and as measured by the initial $O_2^-$ formation rate is $4 \pm 2 \times 10^{15}$ quanta/s.

Lamps containing a small percentage of $N_2$ in an inert gas at a total pressure of 1 Torr emit two lines at 174.3 and 174.5 nm. These are at a nearly ideal wavelength to be absorbed and yet penetrate a significant distance into the water. However, the output of such a lamp is less and lamps of this type were found to produce less $O_2^-$ than either the nongettered Ar lamp or the Xe lamps.

The data obtained shows that considerable amounts of superoxide are formed in oxygen-saturated formate solutions by a short exposure with a rare gas filled lamp. Hydrogen peroxide is a secondary product since its yield is small initially and the ratio $[O_2^-]/[H_2O_2]$ decreases monotonically with time.

The maximum of the continuum emission from the Xe lamp is at a wavelength which is strongly absorbed by water; where $k=[H_2O] \times \epsilon = 700$ cm$^{-1}$. Similarly there are strong emission lines in the Ar lamp in this region. Thus the results are attributed to the photochemical decomposition of water; that is, the main primary process is, as stated earlier dissociation into H and OH. However, it is clear from FIG. 8 that solutes may absorb a fraction of the light at longer wavelengths. Absorption by formate results in dissociation into HCO and OH; the HCO dissociates into H and CO. Absorption by OH⁻ is known to produce OH and $e_{aq}^-$. Solvated electrons react rapidly with $O_2$ to form $O_2^-$. Thus the result of absorption by OH⁻ (important only at very high pH) or by HCOO⁻ would be the same as reactions 1-5. It has been pointed out that oxygen enhances light absorption by water at wavelengths above 185 nm and this is attributed to direct formation of a charge transfer complex. To the extent that the complex dissociates it would form OH and $O_2^-$ and the result again would be the same as in the mechanism given.

Therefore it is assumed that the mechanism includes reactions 1-5. Because of the high intensity, oxygen will be depleted especially near the window. Thus reaction 6, presumed to have a rate constant of $10^{10}$ M$^{-1}$ s$^{-1}$, will convert $O_2^-$ to peroxide. Finally termination (reaction 7) will also occur:

$$H + O_2^- \rightarrow HO_2^- \text{ (peroxide)} \quad (6)$$

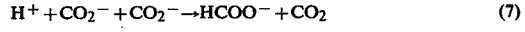

$$H^+ + CO_2^- + CO_2^- \rightarrow HCOO^- + CO_2 \quad (7)$$

In order to compare with experiment the concentrations of $O_2$, $O_2^-$, and $H_2O_2$ based on this mechanism were calculated as a function of time by numerical integration of the coupled rate equations. The calculation was done on a PDP-11 computer using the Runge-Kutta method. Steady state assumptions were made for [H], [OH], and [$CO_2^-$]. The values of rate constants are as follows: $k_2=1.6 \times 10^{10}$, $k_3=1.5 \times 10^8$, $k_4=2.5 \times 10^9$, $k_5=2.4 \times 10^9$, $k_6=1.0 \times 10^{10}$ (assumed), and $k_7=5.0 \times 10^8$ M$^{-1}$ s$^{-1}$.

A typical calculation based on this mechanism is shown in FIG. 9. As a result of numerous calculations it was shown that the mechanism predicts the following: (1) The yield of $O_2^-$ will reach a maximum in the reaction zone equal to 36% of the initial oxygen concentration (460 μM for oxygen saturated). (2) Eventually the $O_2^-$ will be completely converted to peroxide. (3) The initial rate of $O_2^-$ formation will be increased 47% by increasing the initial oxygen concentration fivefold. (4) The time at which the $O_2^-$ maximum occurs is inversely proportional to the absorbed light intensity, and increased by increasing the oxygen concentration.

These predictions are to be compared to the following experimental results: (1) The maximum observed yield of $O_2^-$ is 220 μM for photolysis of an oxygen-saturated formate solution and the yield of $O_2^-$ at the maximum increases with oxygen concentration, but not proportionately. (2) The yield of $O_2^-$ does in time eventually decrease (FIG. 7) and large yields of peroxide are observed (Table I). (3) Increasing the oxygen concentration fivefold enhances the initial rate of $O_2^-$ formation (roughly 20%). (4) The maximum occurs at a longer time if the oxygen concentration is increased (FIG. 6). The differences for different lamps are attributed to differences in absorbed light intensity.

Quantitative agreement of the calculations with the results is not expected for several reasons. One is the depth of the photolysis zone. At the maximum in the Xe emission, 99% of the light is absorbed within 28 μm path length or within 11% of the aqueous volume. Shorter wavelengths will be absorbed in a smaller volume and the resultant high absorbed intensity will result in rapid conversion to peroxide. Longer wavelengths will be more penetrating. The observed maximum yield of 200 μM indicates that in this lamp about one-half of the 0.5 cm³ of water is actually irradiated. Another reason not to expect quantitative agreement is that concentrations are not uniform as assumed. Oxygen will be less and product concentration will be greater near the window; however, diffusion will tend to even this effect out near the window and some mixing by convection will occur as the photolysis progresses. Another complication which has been ignored is photolysis of products. There is practically no emission by these lamps between 195 and 300 nm. However, hydrogen peroxide could be photolyzed by emission around 195 nm. Apparently this is minor since large yields of peroxide build up during photolysis.

Although experiments so far have been concerned primarily with the photolysis of formate solutions. Another interesting system is the photolysis of hydrogen peroxide solutions in which H and OH are converted to $O_2^-$ via reactions 8 and 9:

$$H + H_2O_2 \rightarrow OH + H_2O \quad (8)$$

$$OH + H_2O_2 \rightarrow HO_2 + H_2O \quad (9)$$

As shown in Table II the yield of $O_2^-$ is linear with time. There is no back reaction since ample quantities of peroxide may be added. However, it is necessary to work at lower pH because of the instability of peroxide in base. At the lower pH the second-order disappearance of $O_2^-$ becomes significant and there will be some loss of $O_2^-$ during photolysis by this reaction.

The photolysis of oxygen-saturated water at low pH in the absence of other solutes leads to the formation of $H_2O_3$. In this system the OH radicals react with the $HO_2$ radicals (reaction 2):

$$OH + HO_2 \rightarrow H_2O_3 \qquad (10)$$

The first-order decay rate of $H_2O_3$ formed by photolysis of a solution at pH 2.16 was observed to be $0.86 \pm 0.08$ $s^{-1}$. This is in good agreement with the rate constant obtained in a pulse radiolysis study at this pH.

While only a few embodiments of the present invention have been shown and described, it is to be understood that many changes and modifications can be made hereto without departing from the spirit and scope hereof.

Table I.

| | | | | | | |
|---|---|---|---|---|---|---|
| Photolysis of Formate Solutions with Ar Lamps[a] | | | | | | |
| lamp | | [formate], | [oxygen], | photo-lysis | yields[a] | |
| Torr | W | mM | mM | time,s | $O_2^-$,µM | $H_2O_2$,µM |
| 1.0 | 50 | 10 | 1.28 | 2 | 38 | |
| 1.0 | 50 | 10 | 1.28 | 15 | 110 | |
| 1.0 | 20 | 10 | 1.28 | 10 | 37 | |
| 1.0 | 100 | 10 | 1.28 | 10 | 96 | |
| 1.0 | 50 | 0 | 0.25 | 8 | 11 | |
| 1.0 | 50 | 1 | 0.25 | 8 | 49 | |
| 1.0 | 50 | 10 | 0.25 | 8 | 49 | |
| 1.0 | 50 | 50 | 0.25 | 8 | 54 | |
| 1.0 | 50 | 100 | 0.25 | 8 | 57 | |
| 10.0 | 20 | 20 | 1.28 | 2 | 25 | 0 |
| 10.0 | 20 | 20 | 1.28 | 5 | 60 | 58 |
| 10.0 | 20 | 20 | 1.28 | 10 | 110 | 110 |
| 10.0 | 20 | 20 | 1.28 | 30 | 190 | 480 |
| 10.0 | 20 | 20 | 1.28 | 50 | 220 | 930 |

[a]Measured concentration of product in lamp.

Table II.

| | | | |
|---|---|---|---|
| Photolysis with Xe Lamps | | | |
| lamp | | photolysis | yields[a] |
| Torr | W | time,s | $O_2^-$,µM  $H_2O_2$,µM |
| Oxygen-Saturated, 0.02 M Formate Solution | | | |
| 1.0 | 50 | 10 | 59   36 |
| 7.5 | 60 | 2 | 15   0 |
| 7.5 | 60 | 10 | 59   20 |
| 7.5 | 60 | 30 | 61   42 |
| 7.5 | 60 | 80 | 60   240 |
| 30.0 | 50 | 3 | 30   14 |
| 30.0 | 50 | 10 | 68   54 |
| 30.0 | 50 | 30 | 140   180 |
| 30.0 | 50 | 80 | 220   400 |
| 30.0 | 50 | 120 | 200   560 |
| 44.0 | 50 | 10 | 128 |
| 200.00 | 50 | 10 | 117 |
| 0.8 (5% N$_2$) | 50 | 8 | 55   49 |
| 30.0 | 10 | 5 | 5 |
| 30.0 | 20 | 5 | 8 |
| 30.0 | 40 | 5 | 18 |
| 30.0 | 80 | 5 | 46 |
| Air-Saturated, 0.15 M Hydrogen Peroxide Solutions (pH 10.6)[a,b] | | | |
| 7.5 | 60 | 10 | 25 |
| 7.5 | 60 | 20 | 37 |
| 7.5 | 60 | 40 | 80 |
| 7.5 | 60 | 100 | 176 |

[a]Measured concentration of product in lamp at end of run.
[b]At this lower pH a larger decay of $O_2^-$ is expected.

What is claimed is:

1. A method of generating superoxide radicals ($O_2^-$) in oxygenated water including the steps of forming a formate solution with the water, and exposing a quantity of formate solution to intense far-ultraviolet light thereby photodecomposing the solution and forming superoxide radicals ($O_2^-$).

2. The method of claim 1, stabilizing the superoxide radicals by increasing the pH of the formate solution to over 11.

3. The method of claim 2, adding oxygen to the formate solution so that same becomes oxygen-saturated.

4. The method of claim 1, said far-ultraviolet light exposure step being performed by providing a flow-path comprised of high purity quartz tubing, the flow path acting as a window for the far-ultraviolet light, placing the flow-path within a sealed envelope containing a rare gas under low pressure, and exciting the rare gas by microwave means whereby the gas emits an intense flux of far-ultraviolet light acting to photodecompose the formate solution and thereby form the product radical ($O_2^-$).

5. A photochemical process for generating superoxide radicals ($O_2^-$) in an aqueous solution including the steps of forming a solution of sodium formate and oxygenated water, buffering the solution at a high pH, and subjecting the buffered solution to an intense flux of far-ultraviolet light, the intense flux of far-ultraviolet light acting to photodecompose the solution and form the superoxide radical ($O_2^-$).

6. The photochemical process of claim 5, said flux-subjecting step being performed by forming a flow-path through which the buffered solution flows, the flow-path so formed being substantially transparent to the far-ultraviolet light and having flow-input means and flow-output means, placing the flow-path within a sealed envelope containing a rare gas under low pressure, and exciting the rare gas so that same emits intense far-ultraviolet light thereby photodecomposing the buffered solution and forming the product radical $O_2^-$.

7. The photochemical process of claim 5, the flow-path so formed being comprised of high purity quartz.

8. The photochemical process of claim 6, said exciting step being accomplished by coupling microwave energy to the rare gas.

9. The photochemical process of claim 8, the rare gas being excited being selected from the group consisting of Argon or Xenon.

10. A photochemical process for generating superoxide ($O_2^-$) radicals in an aqueous mixture and adapted for use with a stopped-flow radiolysis machine including the steps of forming an oxygen-saturated formate solution in water, and irradiating the solution with an intense flux of far-ultraviolet light thereby causing the solution to photodecompose and form the product radical $O_2^-$.

11. The process of claim 10, said irradiating step being accomplished by placing a flow-path within a sealed envelope containing a rare gas under low pressure, the flow-path being substantially transparent to ultraviolet light and having input means and output means, pumping the oxygen-saturated formate solution through the flow path, and exciting the rare gas by means of microwave energy thereby driving the rare gas to emit intense far-ultraviolet light and causing the photodecomposition of the oxygen-saturated formate solution.

12. The process of claim 11, buffering the oxygen-saturated formate solution at high pH thereby stabilizing the product radicals.

13. A method of generating superoxide radicals ($O_2^-$) in water including the steps of forming a hydrogen peroxide solution with the water and exposing a quantity of the peroxide solution to intense far-ultraviolet light, thereby photodecomposing the solution and forming superoxide radicals ($O_2^-$).

* * * * *

UNITED STATES PATENT OFFICE
CERTIFICATE OF CORRECTION

Patent No. 4,199,419    Dated April 22, 1980

Inventor(s) Richard A. Holroyd, Benon H. J. Bielski

It is certified that error appears in the above-identified patent and that said Letters Patent are hereby corrected as shown below:

Column 1, line 13, please insert the phrase --with additional support from the National Institute of Health-- after the word "Energy".

Signed and Sealed this

Tenth Day of November 1981

[SEAL]

Attest:

Attesting Officer

GERALD J. MOSSINGHOFF

Commissioner of Patents and Trademarks